(12) United States Patent
Luo et al.

(10) Patent No.: US 11,516,769 B2
(45) Date of Patent: Nov. 29, 2022

(54) METHOD PERFORMED BY USER EQUIPMENT, AND USER EQUIPMENT

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/278,150

(22) PCT Filed: Sep. 24, 2019

(86) PCT No.: PCT/CN2019/107524
§ 371 (c)(1),
(2) Date: Mar. 19, 2021

(87) PCT Pub. No.: WO2020/063587
PCT Pub. Date: Apr. 2, 2020

(65) Prior Publication Data
US 2021/0352615 A1 Nov. 11, 2021

(30) Foreign Application Priority Data
Sep. 25, 2018 (CN) .......................... 201811118443.5

(51) Int. Cl.
*H04W 68/00* (2009.01)
(52) U.S. Cl.
CPC .................. *H04W 68/00* (2013.01)
(58) Field of Classification Search
CPC .................................................. H04W 68/00
(Continued)

(56) References Cited

U.S. PATENT DOCUMENTS

2020/0137718 A1* 4/2020 Agiwal ............... H04W 72/042
2020/0169956 A1* 5/2020 Sun ..................... H04L 12/2803
(Continued)

FOREIGN PATENT DOCUMENTS

| WO | 2018/144873 A1 | 8/2018 |
| WO | 2020/055102 A1 | 3/2020 |
| WO | 2020/091390 A1 | 5/2020 |

OTHER PUBLICATIONS

NTT DOCOMO, Inc., "New WID on New Radio Access Technology", RP-170855, 3GPP TSG RAN Meeting #75, Dubrovnik, Croatia, Mar. 6-9, 2017.
(Continued)

*Primary Examiner* — Ted M Wang
(74) *Attorney, Agent, or Firm* — ScienBiziP, P.C.

(57) ABSTRACT

The present invention provides a method performed by user equipment, including: acquiring, from a base station, paging-related parameters, where the paging-related parameters include paging search space configuration parameter-related information; and determining, according to the paging search space configuration parameter-related information, an association mechanism for mapping a physical downlink control channel (PDCCH) monitoring occasion in a paging search space to a PDCCH monitoring occasion for paging, where when the information indicates that a paging search space configuration parameter has been configured and a search space indicated by the paging search space configuration parameter is not a type0-PDCCH common search space, a non-default association mechanism is used; when the information indicates that the paging search space configuration parameter is not configured, or the paging search space configuration parameter-related information indicates that the paging search space configuration parameter has been configured and the search space indicated by the
(Continued)

paging search space configuration parameter is a type0-PDCCH common search space, a default association mechanism is used.

4 Claims, 8 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2020/0178203 A1* | 6/2020 | Lee | H04W 68/005 |
| 2020/0267687 A1* | 8/2020 | Harada | H04W 68/00 |
| 2020/0322918 A1* | 10/2020 | Shih | H04W 56/001 |

OTHER PUBLICATIONS

NTT DOCOMO, "New SID Proposal: Study on New Radio Access Technology", RP-160671, 3GPP TSG RAN Meeting #71, Goteborg, Sweden, Mar. 7-10, 2016.

Samsung, "Reference Frame & PO Determination: Non Default Association", R2-1807689, 3GPP TSG-RAN2 102, Busan, South Korea, May 21-May 25, 2018.

OPPO, "Corrections on paging", R2-1810022, 3GPP TSG-RAN WG2 NR AH1807, Montreal, Canada, Jul. 2-6, 2018.

Samsung Electronics, "Correction to configuration of firstPDCCH-MonitoringOccasionOfPO", R2-1816451 3GPP TSG-RAN2 104, Spokane, USA, Nov. 12-16, 2018.

Huawei, Hisilicon, "Correction for the description forfirstPDCCH-MonitoringOccasionOfPO", R2-1905206 3GPP TSG-TSG-RAN2 Meeting #105b, Xi'an, China, Apr. 8-12, 2019.

Ericsson, "Correction to the configuration of POs within a Pf", R2-1813080 3GPP TSG-RAN2 Meeting #103, Gothenburg, Sweden, Aug. 20-24, 2018.

* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In March 2016, at the 3rd Generation Partnership Project (3GPP) RAN #71 Plenary Session, a new research project on 5G technology standards (see Non-Patent Document 1) was approved. The goal of the research project is to develop a New Radio (NR) access technology to meet all of the application scenarios, requirements, and deployment environments of 5G. NR mainly has three application scenarios: enhanced mobile broadband (eMBB) communications, massive machine type communications (mMTC), and ultra-reliable and low latency communications (URLLC). In June 2017, at the 3GPP RAN #75 Plenary Session, a corresponding 5G NR work project (see Non-Patent Document 2) was approved.

5G supports a paging mechanism. For example, when a network needs to initiate a connection to a certain UE, but the UE is in an RRC_IDLE or RRC_INACTIVE state, then the network can transmit a paging message in one or a plurality of certain areas (for example, a tracking area), so as to page the UE. On the other hand, in order to reduce power consumption of UE, 5G also supports discontinuous reception (DRX), and the basic mechanism thereof is to configure a DRX cycle for the UE, such that the UE only needs to monitor downlink control signaling, such as paging-related control signaling, for part of time within a DRX cycle, and can be in a dormant state for the rest of time (for example, a receiver can be turned off).

At the physical layer, a paging message is borne on a physical downlink shared channel (PDSCH), and the PDSCH is scheduled via a physical downlink control channel (PDCCH). One PDCCH consists of one or a plurality of control-channel elements (CCEs), and one CCE consists of a plurality of (for example, six) resource-element groups (REGs). The REG is defined within a control-resource set (CORESET). One CORESET includes one or a plurality of resource blocks (each resource block consists of 12 consecutive subcarriers in the frequency domain) in the frequency domain, and includes one or a plurality of (for example, one, or two, or three) OFDM symbols in the time domain.

Not all of UE in a cell needs to monitor paging. UE in the RRC_CONNECTED state determines, according to whether a parameter pagingSearchSpace (also referred to as paging-SearchSpace) has been configured (for example, configured via dedicated signaling), whether to monitor paging. UE in the RRC_IDLE or RRC_INACTIVE state has to monitor paging, no matter whether the parameter pagingSearchSpace has been configured (for example, configured via SIB1).

Figure 1:
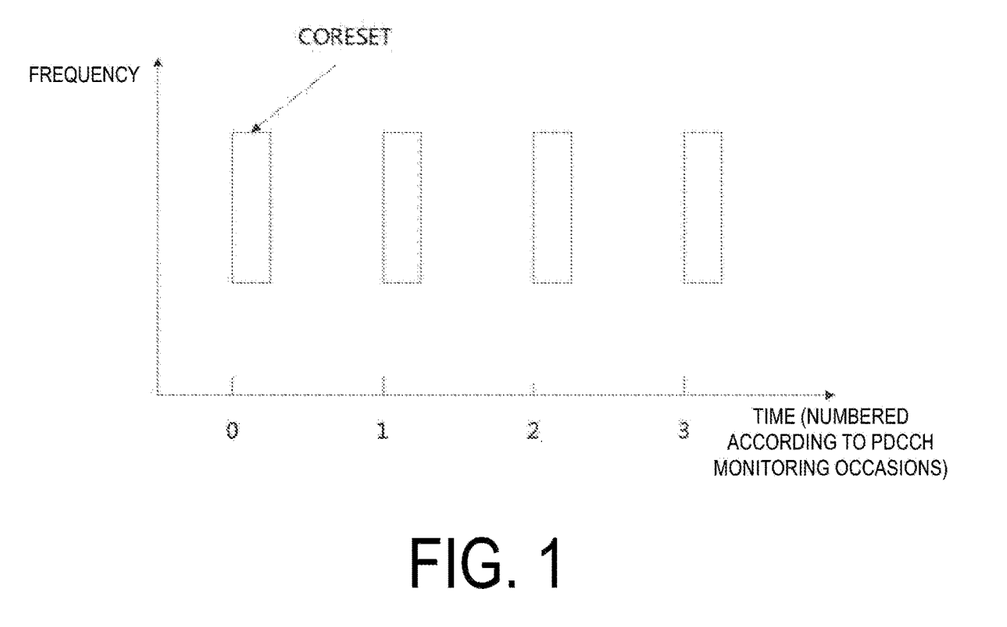
FIG. 1 is a diagram of an example of search space configuration according to the existing 3GPP standards and specifications.

UE monitors a PDCCH at some time domain and frequency domain positions configured by the network where PDCCH transmissions may occur. These time domain and frequency domain positions can be associated with a certain CORESET and a time domain pattern of the CORESET. Such configuration information can be referred to as search space configuration information, and a search space for paging can be referred to as a paging search space. FIG. 1 is an example of search space configuration, where all of PDCCH monitoring occasions in a search space are numbered chronologically in ascending order.

UE, when receiving paging, only needs to monitor part of PDCCH monitoring occasions (referred to as PDCCH monitoring occasions for paging) in a paging search space. Steps in which UE determines a PDCCH monitoring occasion for paging can be described as follows:

1. Determining a paging search space. If the parameter pagingSearchSpace has been configured (no matter which search space the parameter pagingSearchSpace is configured to), then a search space indicated by the parameter pagingSearchSpace is used as the paging search space; otherwise, a type0-PDCCH common search space (the type0-PDCCH common search space is a search space used to monitor SIB1 scheduling information, and may also be referred to as search space 0 because the ID thereof is 0) is used as the paging search space.

2. Determining an association mechanism, that is, which mechanism is used to define which PDCCH monitoring occasions in the paging search space as PDCCH monitoring occasions for paging. The existing 3GPP standards and specifications define two association mechanisms: a default association mechanism and a non-default association mechanism. If the parameter pagingSearchSpace has been configured, then the non-default association mechanism is used; otherwise, the default association mechanism is used.

3. Determining a paging frame (PF).

One or a plurality of PFs are defined in each DRX cycle. The UE is associated with one of the PFs according to a UE identifier (for example, a UE identification determined according to a parameter 5G-S-TMSI, for example, UE_ID=5G-S-TMSI mod 1024). For example, the UE calculates, via the following formula, a system frame number (SFN) where the PF associated therewith is located:

$$(SFN+PF\_\text{offset}) \bmod T = (T \text{ div } N)*(UE\_ID \bmod N)$$

where

SFN is the system frame number where the PF to be calculated is located.

PF_offset is an offset value used to calculate the PF.

T is a DRX cycle. For example, a default DRX cycle can be configured by a parameter defaultPagingCycle in paging control channel configuration information (for example, configuration information indicated by a parameter pcch-Config).

N is the number of PFs in the DRX cycle. Both N and PF_offset can be configured via a parameter nAndPagingFrameOffset in the paging control channel configuration information.

4. Determining a paging occasion (PO).

Each PF corresponds to one or a plurality of POs, and each PO corresponds to a group of PDCCH monitoring occasions for paging. For example, the number of PDCCH monitoring occasions for paging corresponding to each PO is equal to the number of PDCCH monitoring occasions required for performing one beam sweeping.

The number (Ns) of POs corresponding to each PF can be configured via a parameter ns in the paging control channel configuration information. The UE is associated with one of the POs according to the UE identifier. For example, the UE calculates, via the following formula, the index of a PO associated therewith:

$$i\_s = \text{floor}(UE\_ID/N) \bmod Ns.$$

5. Determining a corresponding PDCCH monitoring occasion for paging in the associated PO according to a reference beam (for example, an SSB index; generically, different SSBs use different transmission beams) and/or other parameters.

In the existing 3GPP standards and specifications, the paging control channel configuration information is defined as follows:

```
PCCH-Config ::=                         SEQUENCE {
    defaultPagingCycle                      PagingCycle,
    nAndPagingFrameOffset                   CHOICE {
        oneT                                    NULL,
        halfT                                   INTEGER (0..1),
        quarterT                                INTEGER (0..3),
        oneEighthT                              INTEGER (0..7),
        oneSixteenthT                           INTEGER (0..15)
    },
    ns                                      ENUMERATED {four, two, one},
    firstPDCCH-MonitoringOccasionOfPO       CHOICE {
        sCS15KHZoneT
            SEQUENCE (SIZE (1..4)) OF INTEGER (0..139),
        sCS30KHZoneT-SCS15KHZhalfT
            SEQUENCE (SIZE (1..4)) OF INTEGER (0..279),
        sCS60KHZoneT-SCS30KHZhalfT-SCS15KHZquarterT
            SEQUENCE (SIZE (1..4)) OF INTEGER (0..559),
        sCS120KHZoneT-SCS60KHZhalfT-SCS30KHZquarterT-SCS15KHZoneEighthT
            SEQUENCE (SIZE (1..4)) OF INTEGER (0..1119),
        sCS120KHZhalfT-SCS60KHZquarterT-SCS30KHZoneEighthT-SCS15KHZoneSixteenthT
            SEQUENCE (SIZE (1..4)) OF INTEGER (0..2239),
        sCS120KHZquarterT-SCS60KHZoneEighthT-SCS30KHZoneSixteenthT
            SEQUENCE (SIZE (1..4)) OF INTEGER (0..4479),
        sCS120KHZoneEighthT-SCS60KHZoneSixteenthT
            SEQUENCE (SIZE (1..4)) OF INTEGER (0..9959),
        sCS120KHZoneSixteenthT
            SEQUENCE (SIZE (1..4)) OF INTEGER (0..17919)
    }           OPTIONAL,              -- Need R
    ...
}
``` in case of the default association mechanism, for step 4 and step 5 in which UE determines a PDCCH monitoring occasion for paging, the value of Ns can only be 1 or 2. If Ns=1, then for a given PF, only one PO exists, and the PO starts from an SFN where the PF is located. If Ns=2, then for a given PF, two POs exist; the PO corresponding to i_s=0 is located in the first half frame of an SFN where the PF is located, and the PO corresponding to i_s=1 is located in the second half frame of the SFN where the PF is located.

The UE determines PDCCH monitoring occasions according to a relationship for mapping an SSB index to a PDCCH monitoring occasion in the type0-PDCCH common search space, and uses these PDCCH monitoring occasions as PDCCH monitoring occasions for paging.

Figure 2:
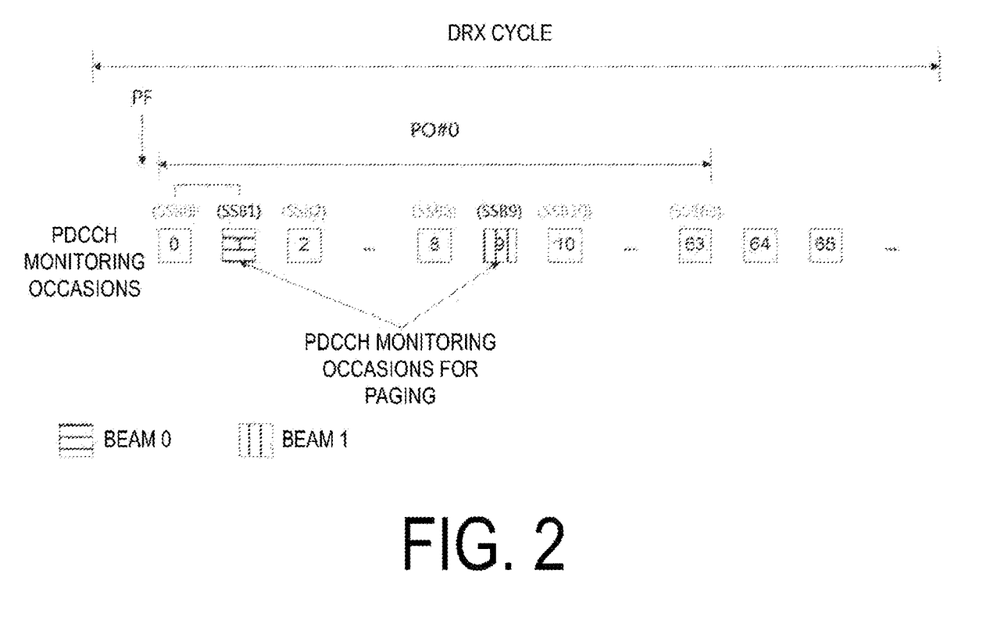
FIG. 2 is a diagram of an example of a default association mechanism used by UE.

FIG. 2 is an example of the default association mechanism. It is assumed that Ns=1, and a base station transmits only SSB1 and SSB9 (that is, one beam sweeping involves only two beams), then UE detects either SSB1 or SSB9, and calculates the position of the PDCCH monitoring occasion for paging according to the index of the detected SSB and the relationship for mapping the SSB index to the PDCCH monitoring occasion in the type0-PDCCH common search space. It can be seen that, during calculation, the UE only cares about the SSB index used thereby, and does not care how many and/or which SSBs are actually transmitted by the base station.

In case of the non-default association mechanism, for step 4 and step 5 in which UE determines a PDCCH monitoring occasion for paging, starting from the first PDCCH monitoring occasion in an SFN where the PF is located, all of "valid PDCCH monitoring occasions" (for example, PDCCH monitoring occasions not overlapping an uplink symbol) in the paging search space can be used as PDCCH monitoring occasions for paging (numbered from 0 in a chronological order).

the first PO (namely the PO corresponding to i_s=0) starts from the SFN where the PF is located.

If a parameter firstPDCCH-MonitoringOccasionOfPO has been configured, then PDCCH monitoring occasions for paging corresponding to the (i_s+1)-th PO are S consecutive PDCCH monitoring occasions for paging starting from the PDCCH monitoring occasion indicated by the (i_s+1)-th value of the parameter firstPDCCH-MonitoringOccasionOfPO, where S is the number of actually transmitted SSBs, and for example, S can be determined via a parameter ssb-PositionsInBurst in SIB1.

If the parameter firstPDCCH-MonitoringOccasionOfPO is not configured, then PDCCH monitoring occasions for paging corresponding to the (i_s+1)-th PO are S consecutive PDCCH monitoring occasions for paging starting from the PDCCH monitoring occasion for paging numbered (i_s*S), where S is the number of actually transmitted SSBs, and for example, S can be determined via the parameter ssb-PositionsInBurst in SIB1.

Figure 3:
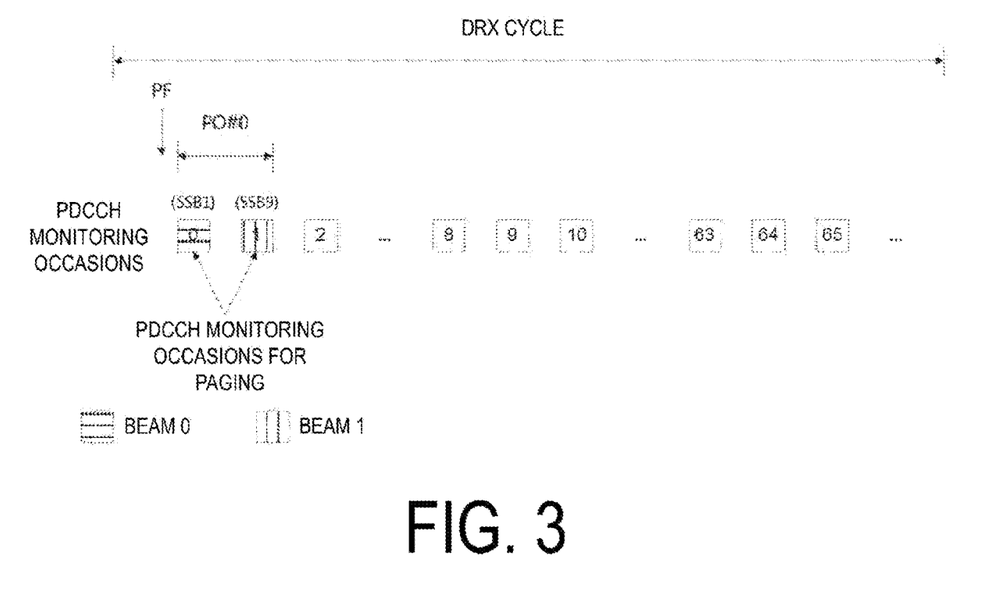
FIG. 3 is a diagram of an example of a non-default association mechanism used by UE.

FIG. 3 is an example of the non-default association mechanism. It is assumed that PDCCH monitoring occasions 0 and 1 are both "valid PDCCH monitoring occasions," that is, can be used as PDCCH monitoring occasions for paging; the parameter firstPDCCH-MonitoringOccasionOfPO is not configured; Ns=1, and a base station transmits only SSB1 and SSB9 (that is, S=2), then, for a given PF, PDCCH monitoring occasions for paging corresponding to a corresponding PO are two consecutive PDCCH monitoring occasions starting from the PDCCH monitoring occasion numbered 0.

Additionally, in the existing 3GPP standards and specifications, a network can allocate one or a plurality of "bandwidth parts" (BWPs) to each UE. Each BWP includes one or a plurality of consecutive resource blocks (RBs). Uplink and downlink BWPs used by UE during initial access are respectively referred to as an initial active uplink BWP and an initial active downlink BWP, and uplink and downlink BWPs used by UE during non-initial access (that is, in cases other than initial access) are respectively referred to as an active uplink BWP and an active downlink BWP. One paging search space can be configured for each BWP via the parameter pagingSearchSpace.

In the existing 3GPP standards and specifications, a paging-related mechanism has the following problems:

1. When the parameter pagingSearchSpace in SIB1 is not configured, UE in the RRC_IDLE or RRC_INACTIVE state determines a PDCCH monitoring occasion for paging according to a default association mechanism. On the other hand, if a base station expects that UE in the RRC_CONNECTED state also monitors paging in the same paging search space, the base station needs to configure the parameter pagingSearchSpace of the UE to 0; however, in this way, the UE in the RRC_CONNECTED state is caused to use the non-default association mechanism to determine a PDCCH monitoring occasion for paging. However, the type0-PDCCH common search space cannot provide an active default association mechanism and an active non-default association mechanism at the same time. For example, as shown in FIG. 2 (the default association mechanism), UE assumes that PDCCH monitoring occasion 1 uses beam 0 to perform transmission; however, as shown in FIG. 3 (the non-default association mechanism), UE assumes that PDCCH monitoring occasion 1 uses beam 1 to perform transmission. However, a base station using analog beamforming cannot simultaneously use different beams to perform transmission at the same time (for example, on one or a plurality of symbols).

2. Ns (the parameter used to configure the number of POs corresponding to each PF) is a cell-level parameter, and is used for both the default association mechanism and the non-default association mechanism, where in the default association mechanism, only Ns=1 or Ns=2 can be configured, while in the non-default association mechanism, Ns=1 or Ns=2 or Ns=4 can be configured. The problems are as follows:

If some UEs in a cell use the default association mechanism (for example, UE in the RRC_IDLE or RRC_CONNECTED state), and the other UEs use the non-default association mechanism (for example, when an active downlink BWP of the UE and CORESET associated with the type0-PDCCH common search space do not overlap in the frequency domain), then the UE using the non-default association mechanism cannot use Ns=4.

For the default association mechanism, only in "SSB and CORESET multiplexing state 2 or 3," and only when the transmission period of the SSB is 5 ms, it is possible to configure Ns=2. In all of the other cases, only Ns=1 can be configured. In other words, although Ns is a configurable parameter, the value thereof is almost completely dependent on other parameters, and the value places a limit on both the default association mechanism and the non-default association mechanism, so that the configuration of Ns of the non-default association mechanism is extremely inflexible.

3. In Time Division Duplex (TDD), the parameter firstPDCCH-MonitoringOccasionOfPO is used to indicate the first PDCCH monitoring occasion of each PO. The problem is that, cycles in which downlink slots (and/or symbols) configured in a cell occur and cycles in which POs (for example, the first PO corresponding to the first PF in each DRX cycle) occur may not have an integer multiple relationship therebetween (that is, the former is not an integral multiple of the latter, and the latter is not an integral multiple of the former). Therefore, the following cases may occur: for a given PO number (for example, the first PO corresponding to the PF), in some DRX cycles, a PDCCH monitoring occasion indicated for the PO by the parameter firstPDCCH-MonitoringOccasionOfPO is a "valid PDCCH monitoring occasion"; however, in other DRX cycles, a PDCCH monitoring occasion indicated for the PO by the parameter firstPDCCH-MonitoringOccasionOfPO is not a "valid PDCCH monitoring occasion" (and cannot be used as a PDCCH monitoring occasion for paging).

Therefore, the paging mechanism in the existing 3GPP standards and specifications needs to be improved. For example, the definitions of the default association mechanism and the non-default association mechanism need to be improved, so as to ensure that UE in the RRC_CONNECTED state can determine a PDCCH monitoring occasion for paging according to the default association mechanism. As another example, the definition of Ns and/or the configuration mechanism for Ns is improved, so as to ensure a flexible configuration for Ns in the non-default association mechanism. As yet another example, the mechanism of the parameter firstPDCCH-MonitoringOccasionOfPO indicating the first PDCCH monitoring occasion of the PO is improved, so as to ensure that the indicated PDCCH monitoring occasions for paging are all "valid PDCCH monitoring occasions."

PRIOR ART DOCUMENT

Non-Patent Document

Non-Patent Document 1: RP-160671, New SID Proposal: Study on New Radio Access Technology Non-Patent Document 2: RP-170855, New WID on New Radio Access Technology

SUMMARY

In order to solve at least part of the aforementioned problems, the present invention provides a method performed by user equipment and user equipment, so as to ensure, by improving the definitions of the default association mechanism and the non-default association mechanism, and/or the configuration of paging-related parameters, that UE in the RRC_CONNECTED state can determine a PDCCH monitoring occasion for paging according to the default association mechanism, or ensure, by improving the definition of Ns and/or the configuration mechanism for Ns, a flexible configuration for Ns in the non-default association mechanism, or ensure, by improving the definition of the non-default association mechanism, that all of PDCCH monitoring occasions for paging indicated in TDD are "valid PDCCH monitoring occasions."

According to the present invention, a method performed by user equipment is provided, comprising: acquiring, from a base station, paging-related parameters, wherein the paging-related parameters include paging search space configuration parameter-related information; and determining, according to the paging search space configuration parameter-related information, an association mechanism for mapping a physical downlink control channel (PDCCH) monitoring occasion in a paging search space to a PDCCH monitoring occasion for paging, wherein when the paging search space configuration parameter-related information indicates that a paging search space configuration parameter has been configured and a search space indicated by the paging search space configuration parameter is not a type0-

PDCCH common search space, a non-default association mechanism is used; when the paging search space configuration parameter-related information indicates that the paging search space configuration parameter is not configured, or the paging search space configuration parameter-related information indicates that the paging search space configuration parameter has been configured and the search space indicated by the paging search space configuration parameter is a type0-PDCCH common search space, a default association mechanism is used.

Preferably, a paging search space used in the default association mechanism is a type0-PDCCH common search space, and a paging search space used in the non-default association mechanism is a paging search space configured according to the paging search space configuration parameter.

Preferably, when in a radio resource control idle state, namely an RRC_IDLE state, or a radio resource control inactive state, namely an RRC_INACTIVE state, the user equipment acquires the paging search space configuration parameter-related information via a system information block 1, namely a SIB1.

Preferably, when in a radio resource control connected state, namely an RRC_CONNECTED state, the user equipment acquires the paging search space configuration parameter-related information via a system information block 1, namely a SIB1, or dedicated signaling.

In addition, according to the present invention, a method performed by user equipment is provided, comprising: acquiring, from a base station, paging-related parameters and/or system access-related parameters, wherein the paging-related parameters include paging search space configuration parameter-related information; determining, according to the paging search space configuration parameter-related information, an association mechanism for mapping a physical downlink control channel (PDCCH) monitoring occasion in a paging search space to a PDCCH monitoring occasion for paging; and determining, according to the determined association mechanism, the paging-related parameters, and/or the system access-related parameters, the number of paging occasions corresponding to each paging frame.

Preferably, the system access-related parameters include a synchronizing signal/physical broadcast channel block (SSB) and control-resource set (CORESET) multiplexing state and an SSB period. The paging-related parameters further includes paging control channel configuration information. When the determined association mechanism is a default association mechanism, when the determined association mechanism is a non-default association mechanism, the user equipment determines, according to a first parameter included in the paging control channel configuration information, the number of paging occasions corresponding to each paging frame; the user equipment determines, according to the SSB and CORESET multiplexing state and the SSB period, the number of paging occasions corresponding to each paging frame, determines, according to a second parameter different from the first parameter and included in the paging control channel configuration information, the number of paging occasions corresponding to each paging frame, or determines, according to a predefined value, the number of paging occasions corresponding to each paging frame.

Preferably, when in a radio resource control idle state, namely an RRC_IDLE state, or a radio resource control inactive state, namely an RRC_INACTIVE state, the user equipment acquires the paging search space configuration parameter-related information via a system information block 1, namely a SIB1.

Preferably, when in a radio resource control connected state, namely an RRC_CONNECTED state, the user equipment acquires the paging search space configuration parameter-related information via a system information block 1, namely a SIB1, or dedicated signaling.

In addition, according to the present invention, a method performed by user equipment is provided, comprising: acquiring from a base station paging-related parameter configuration information such as paging control channel configuration information; and determining, according to the acquired paging-related parameter configuration information, a paging parameter to be used, such as the number of POs corresponding to each PF.

In addition, according to the present invention, a method performed by user equipment is provided, comprising: acquiring, from a base station, paging-related parameters, wherein the paging-related parameters include paging search space configuration parameter-related information; determining, according to the paging search space configuration parameter-related information, an association mechanism for mapping a physical downlink control channel (PDCCH) monitoring occasion in a paging search space to a PDCCH monitoring occasion for paging; and determining, according to the determined association mechanism and the paging-related parameters, POs corresponding to each PF and a PDCCH monitoring occasion for paging of each PO.

In addition, according to the present invention, user equipment is provided, comprising: a processor; and a memory, stored with instructions, wherein the instructions, when run by the processor, perform the method described above.

EFFECT OF INVENTION

According to the present invention, the definitions of the default association mechanism and the non-default association mechanism and/or the configuration of paging-related parameters is improved, so as to ensure that UE in the RRC_CONNECTED state can determine a PDCCH monitoring occasion for paging according to the default association mechanism, or the definition and/or the configuration mechanism for Ns is improved, so as to ensure a flexible configuration for Ns in the non-default association mechanism, or the definition of the non-default association mechanism is improved, so as to ensure that all of PDCCH monitoring occasions for paging indicated in TDD are "valid PDCCH monitoring occasions."

BRIEF DESCRIPTION OF THE DRAWINGS

The above and other features of the present invention will be more pronounced through the following detailed description taken in conjunction with the accompanying drawings.

DETAILED DESCRIPTION

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

In the following description, a 5G mobile communication system and its subsequently evolved versions are used as illustrative application environments to set forth a plurality of embodiments according to the present invention in detail. However, it is to be noted that the present invention is not limited to the following embodiments, and rather, it is applicable to many other wireless communication systems, such as a communication system later than 5G and a 4G mobile communication system earlier than the 5G.

Some terms involved in the present invention are described below. Unless otherwise specified, the terms used in the present invention adopt the definitions herein. The terms given in the present invention may be named differently in LTE, LTE-Advanced, LTE-Advanced Pro, NR, and later communication systems, but unified terms are adopted in the present invention. When applied to a specific system, the terms may be replaced with terms adopted in the corresponding system.

3GPP: 3rd Generation Partnership Project
BWP: Bandwidth Part
CCE: Control-Channel Element
CORESET: Control-Resource Set
DRX: Discontinuous Reception
eMBB: Enhanced Mobile Broadband
IE: Information Element
LTE-A: Long Term Evolution-Advanced
MAC: Medium Access Control
MAC CE: MAC Control Element
mMTC: massive Machine Type Communication
NR: New Radio
OFDM: Orthogonal Frequency Division Multiplexing
PBCH: Physical Broadcast Channel
PCCH: Paging Control Channel
PDCCH: Physical Downlink Control Channel
PDSCH: Physical Downlink Shared Channel
PF: Paging Frame
PO: Paging Occasion
REG: Resource-Element Group
RRC: Radio Resource Control
SFN: System Frame Number
SSB: SS/PBCH block
UE: User Equipment
URLLC: Ultra-Reliable and Low Latency Communication Embodiment 1

Figure 4:
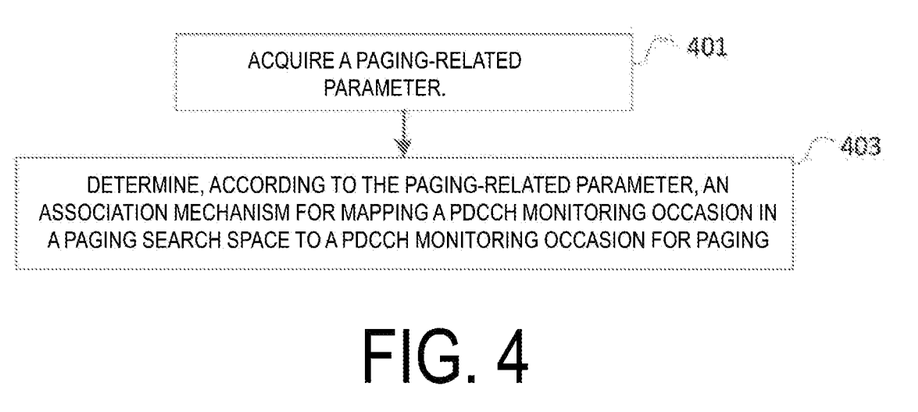
FIG. 4 is a flowchart of a method performed by user equipment according to Embodiment 1 of the present invention.

FIG. 4 is a flowchart of a method performed by user equipment according to Embodiment 1 of the present invention.

In Embodiment 1 of the present invention, the steps performed by user equipment (UE) comprise:

In step 401, acquire paging-related parameters. The paging-related parameters include, for example, paging search space configuration parameter-related information (for example, whether a paging search space has been configured, and/or a paging search space identifier, etc.). The paging search space can be configured via a parameter pagingSearchSpace, and can also be configured via other parameters.

In step 403, determine, according to the aforementioned acquired paging-related parameters, an association mechanism to be used. For example, the association mechanism to be used is determined according to the paging search space configuration parameter-related information. For example, if the parameter pagingSearchSpace has been configured and a search space indicated by pagingSearchSpace is not a reference search space, then a non-default association mechanism is used; otherwise, a default association mechanism is used. Herein, the reference search space can be a type0-PDCCH common search space (also referred to as a search space 0 or a search space for SIB1) or another preset search space.

Optionally, in Embodiment 1 of the present invention, if the UE is in an RRC_IDLE or RRC_INACTIVE state, then the UE acquires paging-related parameter configuration information via system information such as SIB1.

Optionally, in Embodiment 1 of the present invention, if the UE is in an RRC_CONNECTED state, then the UE acquires paging-related parameter configuration information via one or more of the following mechanisms:

System information such as SIB1.
Dedicated signaling.

For example, for the UE in the RRC_CONNECTED state, if a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1 and a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1, then the UE considers that the parameter pagingSearchSpace is not configured.

As another example, for the UE in the RRC_CONNECTED state, if the parameter pagingSearchSpace is configured in system information such as SIB1, then the UE considers that the parameter pagingSearchSpace has been configured.

As another example, for the UE in the RRC_CONNECTED state, if the parameter pagingSearchSpace is configured in system information such as SIB1 or a base station configures the parameter pagingSearchSpace for the UE via dedicated signaling, then the UE considers that the parameter pagingSearchSpace has been configured.

As another example, for the UE in the RRC_CONNECTED state, if a base station configures the parameter pagingSearchSpace for the UE via dedicated signaling, then the UE considers that the parameter pagingSearchSpace has been configured.

Optionally, in Embodiment 1 of the present invention, if the UE is in the RRC_CONNECTED state, then for the paging-related parameter configuration information (for example, whether a certain parameter has been configured, and/or what value the parameter is configured to, and so on), an indication of dedicated signaling can override an indication of system information such as SIB1.

Optionally, in Embodiment 1 of the present invention, the association mechanism can refer to a mechanism for determining a PDCCH monitoring occasion for paging, for example, which search space is to be used as the paging search space, and as another example, which mechanism is to be used to define which PDCCH monitoring occasions in the paging search space as PDCCH monitoring occasions for paging. A mechanism for determining the paging search space can be as follows: for the default association mechanism, a type0-PDCCH common search space is always used as the paging search space; for the non-default association mechanism, a search space indicated by the parameter pagingSearchSpace is used as the paging search space. In addition, for the default association mechanism, a mechanism for determining the PDCCH monitoring occasion for paging can be as follows: a PDCCH monitoring occasion is determined according to a relationship for mapping an SSB index to a PDCCH monitoring occasion in the type0-PDCCH common search space, and the determined PDCCH monitoring occasion is used as the PDCCH monitoring occasion for paging.

Embodiment 2

Figure 5:
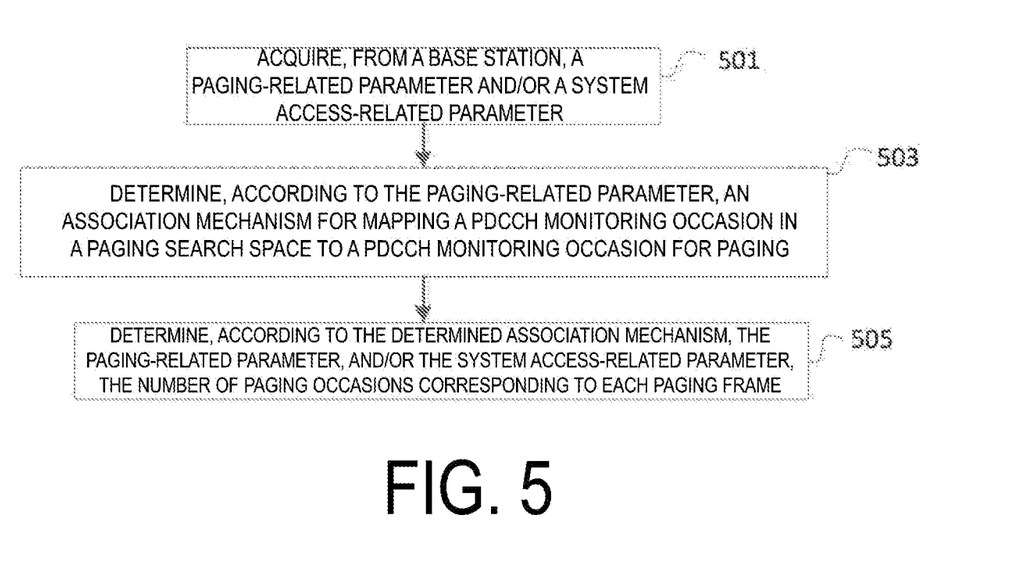
FIG. 5 is a flowchart of a method performed by user equipment according to Embodiment 2 of the present invention.

FIG. 5 is a flowchart of a method performed by user equipment according to Embodiment 2 of the present invention;

In Embodiment 2 of the present invention, the steps performed by user equipment (UE) comprise:

In step 501, acquire paging-related parameters and/or system access-related parameters. The paging-related parameters include, for example, paging search space configuration parameter-related information (for example, whether a paging search space has been configured, and/or a paging search space identifier, etc.). The paging search space can be configured via a parameter pagingSearchSpace, and can also be configured via other parameters.

The system access-related parameters include the following parameters:

SSB and CORESET multiplexing state, configured via, for example, a parameter pdcch-ConfigSIB1.

SSB period, configured via, for example, a parameter ssb-periodicityServingCell.

In addition, the paging-related parameters further include the following parameters:

PO count 1, configured via, for example, a parameter ns in paging control channel configuration information.

PO count 2, configured via, for example, another parameter different from ns in the paging control channel configuration information (for example, a newly added parameter ns2 in the paging control channel configuration information).

In step 503, determine, according to the aforementioned acquired paging-related parameters, an association mechanism to be used. For example, the association mechanism to be used is determined according to the paging search space configuration parameter-related information. Herein, the method for determining an association mechanism described in Background can be used, and the method for determining an association mechanism described in Embodiment 1 described above can also be used. Certainly, the present invention is not limited thereto, and other methods for determining an association mechanism can also be used.

In step 505, determine, according to the determined association mechanism, the paging-related parameters, and/or the system access-related parameters, the number of POs corresponding to each PF.

For example, when a default association mechanism is determined to use, the number of POs corresponding to each PF can be determined according to the SSB and CORESET multiplexing state and the SSB period. For example, if the SSB and CORESET multiplexing state is 3 and the SSB period is 5 ms, then the number of POs corresponding to each PF is 2; otherwise, the number of POs corresponding to each PF is 1.

As another example, when the default association mechanism is determined to use, the number of POs corresponding to each PF can be determined according to the PO count 2.

As another example, when the default association mechanism is determined to use, the number of POs corresponding to each PF can be a predefined value, for example, a positive integer of 1.

As another example, when the non-default association mechanism is determined to use, the number of POs corresponding to each PF can be determined according to the PO count 1.

Optionally, in Embodiment 2 of the present invention, if the UE is in an RRC_IDLE or RRC_INACTIVE state, then the UE acquires configuration information of one or a plurality of paging-related parameters via system information such as SIB1.

Optionally, in Embodiment 2 of the present invention, if the UE is in an RRC_CONNECTED state, then the UE acquires configuration information of one or a plurality of paging-related parameters via one or more of the following mechanisms:

System information such as SIB1.

Dedicated signaling.

For example, for the UE in the RRC_CONNECTED state, if a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1 and a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1, then the UE considers that the parameter pagingSearchSpace is not configured.

As another example, for the UE in the RRC_CONNECTED state, if the parameter pagingSearchSpace is configured in system information such as SIB1, then the UE considers that the parameter pagingSearchSpace has been configured.

As another example, for the UE in the RRC_CONNECTED state, if the parameter pagingSearchSpace is configured in system information such as SIB1 or a base station configures the parameter pagingSearchSpace for the UE via dedicated signaling, then the UE considers that the parameter pagingSearchSpace has been configured.

As another example, for the UE in the RRC_CONNECTED state, if a base station configures the parameter pagingSearchSpace for the UE via dedicated signaling, then the UE considers that the parameter pagingSearchSpace has been configured.

Optionally, in Embodiment 2 of the present invention, if the UE is in the RRC_CONNECTED state, then for one or a plurality of paging-related parameter configuration information (for example, whether a certain parameter has been configured, and/or what value the parameter is configured to, and so on), an indication of dedicated signaling can override an indication of system information such as SIB1.

Optionally, in Embodiment 2 of the present invention, the association mechanism can refer to a mechanism for determining a PDCCH monitoring occasion for paging, for example, which search space is to be used as the paging search space, and as another example, which mechanism is to be used to define which PDCCH monitoring occasions in the paging search space as PDCCH monitoring occasions for paging. A mechanism for determining the paging search space can be as follows: for the default association mechanism, a type0-PDCCH common search space is always used as the paging search space; for the non-default association mechanism, a search space indicated by the parameter pagingSearchSpace is used as the paging search space. In addition, for the default association mechanism, a mechanism for determining the PDCCH monitoring occasion for paging can be as follows: a PDCCH monitoring occasion is determined according to a relationship for mapping an SSB index to a PDCCH monitoring occasion in the type0-PDCCH common search space, and the determined PDCCH monitoring occasion is used as the PDCCH monitoring occasion for paging.

Embodiment 3

Figure 6:
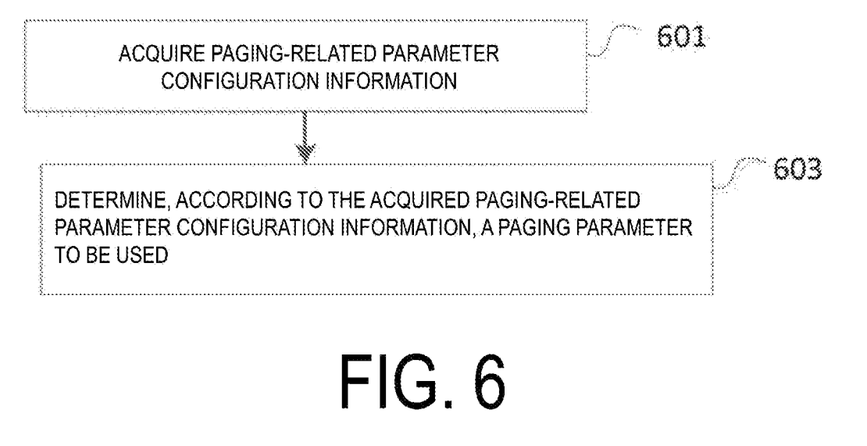
FIG. 6 is a flowchart of a method performed by user equipment according to Embodiment 3 of the present invention.

FIG. 6 is a flowchart of a method performed by user equipment according to Embodiment 3 of the present invention;

In Embodiment 3 of the present invention, the steps performed by user equipment (UE) comprise:

In step 601, acquire paging-related parameter configuration information, for example, paging control channel configuration information. The paging control channel configuration information can include one or more of the following configuration items:

A default DRX cycle, configured via, for example, a parameter defaultPagingCycle.

The number (N) of PFs in a DRX cycle and an offset value (PF_offset) used to calculate a PF, for example, N and PF_offset being configured via a parameter nAndPagingFrameOffset.

The number (Ns) of POs corresponding to each PF, configured via, for example, a parameter ns.

The first PDCCH monitoring occasion of each PO, configured via, for example, a parameter firstPDCCH-MonitoringOccasionOfPO.

For example, paging control channel configuration information in SIB1 is acquired.

As another example, paging control channel configuration information of an initial active downlink BWP is acquired.

As another example, paging control channel configuration information in SIB1 is acquired, and paging control channel configuration information of an initial active downlink BWP is also acquired.

As another example, paging control channel configuration information of an active downlink BWP is acquired.

As another example, paging control channel configuration information in SIB1 is acquired, and paging control channel configuration information of an active downlink BWP is also acquired.

In step 603, determine, according to the acquired paging-related parameter configuration information, a paging parameter to be used.

For example, if only the paging control channel configuration information in SIB1 is acquired, then the paging control channel configuration information in SIB1 is used as a paging parameter of all of downlink BWPs (including the initial active downlink BWP and the active downlink BWP).

As another example, if only the paging control channel configuration information of the initial active downlink BWP is acquired, then the paging control channel configuration information of the initial active downlink BWP is used as a paging parameter of the initial active downlink BWP.

As another example, if only the paging control channel configuration information of the active downlink BWP is acquired, then the paging control channel configuration information of the active downlink BWP is used as a paging parameter of the active downlink BWP.

As another example, if the paging control channel configuration information in SIB1 is acquired, and the paging control channel configuration information of the initial active downlink BWP is also acquired, and if the paging control channel configuration information in SIB1 and the paging control channel configuration information of the initial active downlink BWP both include the same configuration parameter (for example, the number of POs corresponding to each PF, configured via, for example, the parameter ns), then the configuration parameter included in the paging control channel configuration information of the initial active downlink BWP is used as the paging parameter of the initial active downlink BWP.

As another example, if the paging control channel configuration information in SIB1 is acquired, and the paging control channel configuration information of the active downlink BWP is also acquired, and if the paging control channel configuration information in SIB1 and the paging control channel configuration information of the active downlink BWP both include the same configuration parameter (for example, the number of POs corresponding to each PF, configured via, for example, the parameter ns), then the configuration parameter included in the paging control channel configuration information of the active downlink BWP is used as the paging parameter of the active downlink BWP.

Optionally, in Embodiment 3 of the present invention, the UE is UE in the RRC_CONNECTED state.

Embodiment 4

Figure 7:
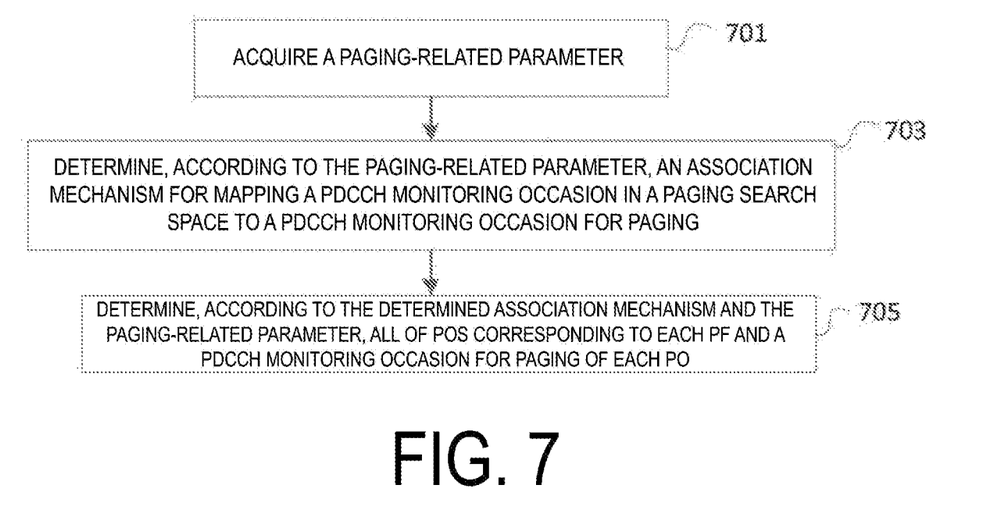
FIG. 7 is a flowchart of a method performed by user equipment according to Embodiment 4 of the present invention.

FIG. 7 is a flowchart of a method performed by user equipment according to Embodiment 4 of the present invention; and In Embodiment 4 of the present invention, the steps performed by user equipment (UE) comprise:

In step 701, acquire paging-related parameters. The paging-related parameters include, for example, paging search space configuration parameter-related information (for example, whether a paging search space has been configured, and/or a paging search space identifier, etc.). The paging search space can be configured via a parameter pagingSearchSpace, and can also be configured via other parameters.

In step 703, determine, according to the aforementioned acquired paging-related parameters, an association mechanism to be used. For example, the association mechanism to be used is determined according to the paging search space configuration parameter-related information. Herein, the method for determining an association mechanism described in Background can be used, and the method for determining an association mechanism described in Embodiment 1 described above can also be used. Certainly, the present invention is not limited thereto, and other methods for determining an association mechanism can also be used.

In step 705, determine, according to the determined association mechanism and the paging-related parameters, POs corresponding to each PF and a PDCCH monitoring occasion for paging of each PO.

For example, when a non-default association mechanism is determined to use, starting from the first PDCCH monitoring occasion in an SFN where the PF is located, all of "valid PDCCH monitoring occasions" (for example, PDCCH monitoring occasions not overlapping an uplink symbol) in the paging search space can be used as PDCCH monitoring occasions for paging (numbered from 0 in a chronological order).

the first PO (namely the PO corresponding to i_s=0) starts from the SFN where the PF is located.

if a parameter firstPDCCH-MonitoringOccasionO/PO has been configured, then PDCCH monitoring occasions for paging corresponding to the (i_s+1)-th PO are S consecutive PDCCH monitoring occasion for paging starting from the first PDCCH monitoring occasion for paging counted from a PDCCH monitoring occasion indicated by the (i_s+1)-th value of the parameter firstPDCCH-MonitoringOccasionO/PO (including the PDCCH monitoring occasion indicated by the (i_s+1)-th value of the parameter firstPDCCH-MonitoringOccasionOfPO). For example, if S=2, and the PDCCH monitoring occasion indicated by the first value of the parameter firstPDCCH-MonitoringOccasionOfPO is PDCCH monitoring occasion for paging 6, then the first PO corresponds to PDCCH monitoring occasion for paging 6 and PDCCH monitoring occasion for paging 7. As another example, if S=2, and the PDCCH monitoring occasion indicated by the first value of the parameter firstPDCCH-MonitoringOccasionOfPO is not a "valid PDCCH monitoring occasion," and if the number of the first PDCCH monitoring occasion for paging counted from the PDCCH monitoring occasion indicated by the first value of the parameter firstPDCCH-MonitoringOccasionOfPO is 2, then the first PO corresponds to PDCCH monitoring occasion for paging 2 and PDCCH monitoring occasion for paging 3.

If the parameter firstPDCCH-MonitoringOccasionOfPO is not configured, then PDCCH monitoring occasions for paging corresponding to the (i_s+1)-th PO are S consecutive PDCCH monitoring occasions for paging starting from the PDCCH monitoring occasion for paging numbered (i_s*S), where S is the number of actually transmitted SSBs, and for example, S can be determined via the parameter ssb-PositionsInBurst in SIB1.

Optionally, in Embodiment 4 of the present invention, if the UE is in an RRC_IDLE or RRC_INACTIVE state, then the UE acquires configuration information of one or a plurality of paging-related parameters via system information such as SIB1.

Optionally, in Embodiment 4 of the present invention, if the UE is in an RRC_CONNECTED state, then the UE acquires configuration information of one or a plurality of paging-related parameters via one or more of the following mechanisms:

System information such as SIB1.

Dedicated signaling.

For example, for the UE in the RRC_CONNECTED state, if a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1 and a base station does not configure the parameter pagingSearchSpace for the UE via dedicated signaling, then the UE considers that the parameter pagingSearchSpace is not configured.

As another example, for the UE in the RRC_CONNECTED state, if the parameter pagingSearchSpace is not configured in system information such as SIB1, then the UE considers that the parameter pagingSearchSpace is not configured.

As another example, for the UE in the RRC_CONNECTED state, if the parameter pagingSearchSpace is configured in system information such as SIB1, then the UE considers that the parameter pagingSearchSpace has been configured.

As another example, for the UE in the RRC_CONNECTED state, if the parameter pagingSearchSpace is configured in system information such as SIB1 or a base station configures the parameter pagingSearchSpace for the UE via dedicated signaling, then the UE considers that the parameter pagingSearchSpace has been configured.

As another example, for the UE in the RRC_CONNECTED state, if a base station configures the parameter pagingSearchSpace for the UE via dedicated signaling, then the UE considers that the parameter pagingSearchSpace has been configured.

Optionally, in Embodiment 4 of the present invention, if the UE is in the RRC_CONNECTED state, then for one or a plurality of paging-related parameter configuration information (for example, whether a certain parameter has been configured, and/or what value the parameter is configured to, and so on), an indication of dedicated signaling can override an indication of system information such as SIB1.

Optionally, in Embodiment 4 of the present invention, the association mechanism can refer to a mechanism for determining a PDCCH monitoring occasion for paging, for example, which search space is to be used as the paging search space, and as another example, which mechanism is to be used to define which PDCCH monitoring occasions in the paging search space as PDCCH monitoring occasions for paging. A mechanism for determining the paging search space can be as follows: for the default association mechanism, a type0-PDCCH common search space is always used as the paging search space; for the non-default association mechanism, a search space indicated by the parameter pagingSearchSpace is used as the paging search space. In addition, for the default association mechanism, a mechanism for determining the PDCCH monitoring occasion for paging can be as follows: a PDCCH monitoring occasion is determined according to a relationship for mapping an SSB index to a PDCCH monitoring occasion in the type0-PDCCH common search space, and the determined PDCCH monitoring occasion is used as the PDCCH monitoring occasion for paging.

The above-described examples and embodiments can be combined with one another as long as no contradiction arises. For example, Embodiment 1 and Embodiment 2 can be used together in combination. In this case, the UE determines the association mechanism to be used according to the steps in Embodiment 1, and determines the number of POs corresponding to each PF according to the steps in Embodiment 2.

Figure 8:
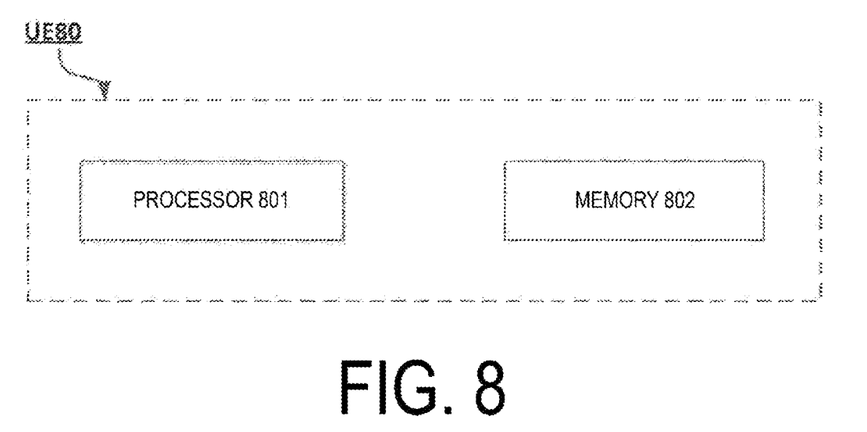
FIG. 8 is a block diagram of user equipment (UE) involved in the present invention.

FIG. 8 is a block diagram of user equipment (UE) involved in the present invention. As shown in FIG. 8, the user equipment (UE) 80 includes a processor 801 and a memory 802. The processor 801 may include, for example, a microprocessor, a microcontroller, an embedded processor, etc. The memory 802 may include, for example, a volatile memory (for example, a random access memory (RAM)), a hard disk drive (HDD), a non-volatile memory (for example, a flash memory), or other memories. Program instructions are stored on the memory 802. The instructions, when executed by the processor 801, can perform the aforementioned method performed by the user equipment as described in detail in the present invention.

The methods and related devices according to the present invention have been described above in conjunction with the preferred embodiments. It should be understood by those skilled in the art that the methods shown above are only exemplary, and the above-described embodiments can be combined with one another as long as no contradiction arises The method of the present invention is not limited to steps or sequences illustrated above. The network node and the user equipment illustrated above may include more modules; for example, they may further include modules which can be developed or developed in the future to be applied to modules of a base station, an MME, or UE. Various identifiers shown above are only exemplary and are not intended to be limiting. The present invention is not limited to specific information elements serving as examples of these identifiers. Those skilled in the art can make various alterations and modifications according to the teachings of the illustrated embodiments.

It should be understood that the above-described embodiments of the present invention may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In the present application, the term "base station" may refer to a mobile communication data and control switching center with large transmit power and a wide coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

Moreover, the embodiments of the present invention disclosed herein can be implemented on a computer program product. More particularly, the computer program product is a product as follows: a product having a computer readable medium encoded with computer program logic thereon, when being executed on a computing equipment, the computer program logic provides related operations to implement the technical solution of the prevent invention. When being executed on at least one processor of a computing system, the computer program logic enables the processor to execute the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. The software or the firmware or such configuration can be installed on the computing equipment, so that one or more processors in the computing equipment execute the technical solution described in the embodiments of the present invention.

In addition, each functional module or each feature of the base station device and the terminal device used in each of the above embodiments may be implemented or executed by a circuit, which is usually one or a plurality of integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present invention may also use integrated circuits obtained using this advanced technology.

Although the present invention is already illustrated above in conjunction with the preferred embodiments of the present invention, those skilled in the art should understand that, without departing from the spirit and scope of the present invention, various modifications, replacements and changes can be made to the present invention. Therefore, the present invention should not be defined by the above embodiments, but should be defined by the appended claims and equivalents thereof.

The invention claimed is:
1. A method performed by user equipment, comprising:
receiving second paging control channel configuration information of an active downlink bandwidth part (BWP), which is a BWP different from an initial active downlink BWP used during initial access, in addition to receiving first paging control channel configuration information in SIB1, each of the first paging control channel configuration information and the second paging control channel configuration information including a corresponding firstPDCCH-MonitoringOccasion-OfPO parameter for configuring a first physical downlink control channel (PDCCH) monitoring occasion of each paging occasion (PO) of a paging frame (PF); and determining the first PDCCH monitoring occasion of each PO of the PF for the active downlink BWP, based on the firstPDCCH-MonitoringOccasionOfPO parameter specific to the active downlink BWP.

2. A method performed by a base station, comprising:

transmitting, to user equipment, second paging control channel configuration information of an active downlink bandwidth part (BWP), which is a BWP different from an initial active downlink BWP used during initial access, in addition to transmitting first paging control channel configuration information in SIB1, each of the first paging control channel configuration information and the second paging control channel configuration information including a corresponding firstPDCCH-MonitoringOccasionOfPO parameter for configuring a first physical downlink control channel (PDCCH) monitoring occasion of each paging occasion (PO) of a paging frame (PF), wherein the firstPDCCH-MonitoringOccasionOfPO parameter specific to the active downlink BWP causes the user equipment to determine the first PDCCH monitoring occasion of each PO of the PF for the active downlink BWP.

3. User equipment, comprising:

a processor; and a memory, stored with instructions;

wherein the instructions, when run by the processor, are executable to:

receive second paging control channel configuration information of an active downlink bandwidth part (BWP), which is a BWP different from an initial active downlink BWP used during initial access, in addition to receiving first paging control channel configuration information in SIB1, each of the first paging control channel configuration information and the second paging control channel configuration information including a corresponding firstPDCCH-MonitoringOccasionOfPO parameter for configuring a first physical downlink control channel (PDCCH) monitoring occasion of each paging occasion (PO) of a paging frame (PF), and determine the first PDCCH monitoring occasion of each PO of the PF for the active downlink BWP, based on the firstPDCCH-MonitoringOccasionOfPO parameter specific to the active downlink BWP.

4. A base station, comprising:

a processor; and a memory, stored with instructions; wherein the instructions, when run by the processor, are executable to transmit, to user equipment, second paging control channel configuration information of an active downlink bandwidth part (BWP), which is a BWP different from an initial active downlink BWP used during initial access, in addition to transmitting first paging control channel configuration information in SIB1, each of the first paging control channel configuration information and the second paging control channel configuration information including a corresponding firstPDCCH-MonitoringOccasionOfPO parameter for configuring a first physical downlink control channel (PDCCH) monitoring occasion of each paging occasion (PO) of a paging frame (PF), and the firstPDCCH-MonitoringOccasionOfPO parameter specific to the active downlink BWP causes the user equipment to determine the first PDCCH monitoring occasion of each PO of the PF for the active downlink BWP.

* * * * *